United States Patent [19]

Golson, Jr. et al.

[11] Patent Number: 5,536,032
[45] Date of Patent: Jul. 16, 1996

[54] IMPLEMENT AND HITCH

[75] Inventors: Charles A. Golson, Jr.; George E. Britton, both of Selma, Ala.

[73] Assignee: Allied Products Corporation, Chicago, Ill.

[21] Appl. No.: 388,195

[22] Filed: Feb. 13, 1995

[51] Int. Cl.$^6$ ..................................................... B60D 1/02
[52] U.S. Cl. ........................................ 280/515; 280/492
[58] Field of Search ..................................... 280/504, 515, 280/492, 493, 494, 204

[56] References Cited

U.S. PATENT DOCUMENTS

| | | | |
|---|---|---|---|
| D. 269,175 | 5/1983 | Perry et al. | D12/162 |
| 2,194,087 | 3/1940 | Jager | 280/475 |
| 2,471,689 | 5/1949 | Hotchkiss, Sr. | 280/515 |
| 2,551,136 | 5/1951 | Keltner | 280/492 |
| 2,583,191 | 1/1952 | Voorhees | 280/494 |
| 2,847,233 | 8/1958 | Minton | 280/504 |
| 2,867,452 | 1/1959 | Ricklick | 280/492 |
| 3,100,373 | 8/1963 | Blanshine | 56/214 |
| 3,465,065 | 9/1969 | Conrad et al. | 280/492 |
| 3,490,790 | 1/1970 | Kees | 280/508 |
| 3,580,612 | 5/1971 | Pearson | 280/492 |
| 3,794,357 | 2/1974 | Frye | 280/515 |
| 3,908,398 | 9/1975 | Braunberger | 180/14.1 |
| 3,998,471 | 12/1976 | Lutchemeier | 280/492 |
| 4,200,306 | 4/1980 | Helms | 280/494 |
| 4,588,199 | 5/1986 | Fisher | 280/494 X |
| 4,711,461 | 12/1987 | Fromberg | 280/494 |
| 5,355,971 | 10/1994 | Austin et al. | 180/53.1 |

FOREIGN PATENT DOCUMENTS

| | | | |
|---|---|---|---|
| 933589 | 4/1948 | France | 280/515 |
| 172740 | 3/1952 | Germany | 280/515 |
| 195194 | 1/1938 | Switzerland | 380/515 |

*Primary Examiner*—Kevin T. Hurley
*Attorney, Agent, or Firm*—Lockwood, Alex, Fitzgibbon & Cummings

[57] ABSTRACT

A tow-behind implement and a hitch therefor are provided. The hitch is for securing the implement to a pulling vehicle such as a tractor. The hitch attaches a farm or industrial implement to the drawbar of a pulling vehicle. The hitch mechanism includes a clevis swingingly and rotatably mounted to an offset hitch component which is secured to the tongue or the like of the pull-behind implement. This swinging attachment is at a location forward of the hitch pin. The clevis remains parallel to the drawbar regardless of the attitude of the implement in order to increase contact surface area. In addition, the weight of the implement is ahead of the hitch pin in order to reduce stress on the drawbar. Angular movement which is provided by the hitch is greater than that provided by standard implement hitch devices.

31 Claims, 2 Drawing Sheets

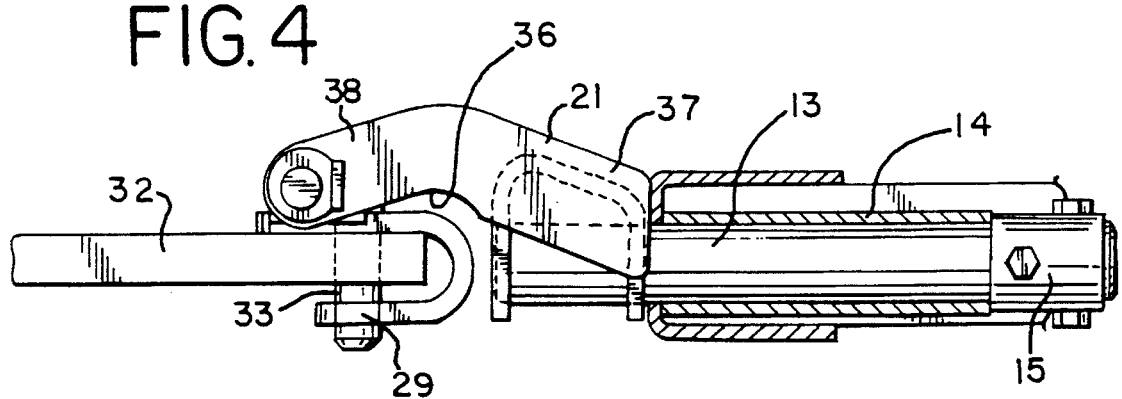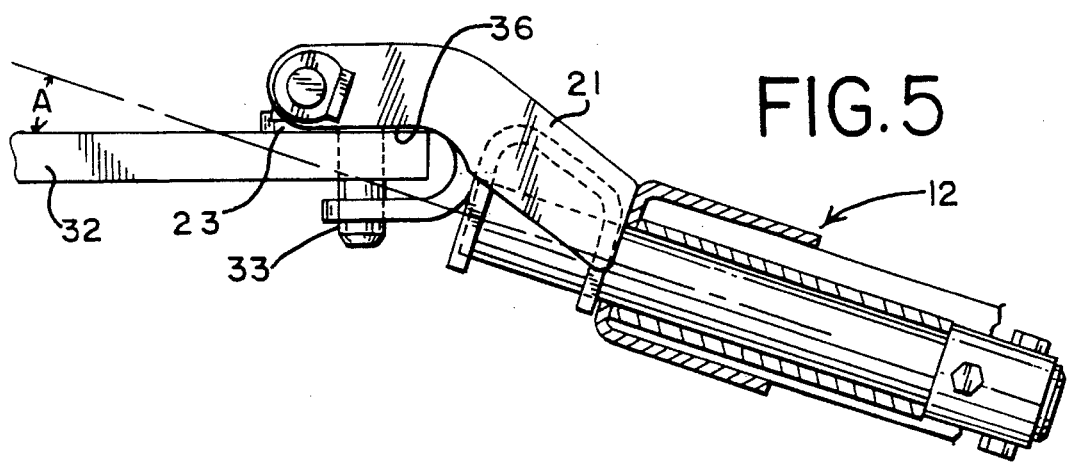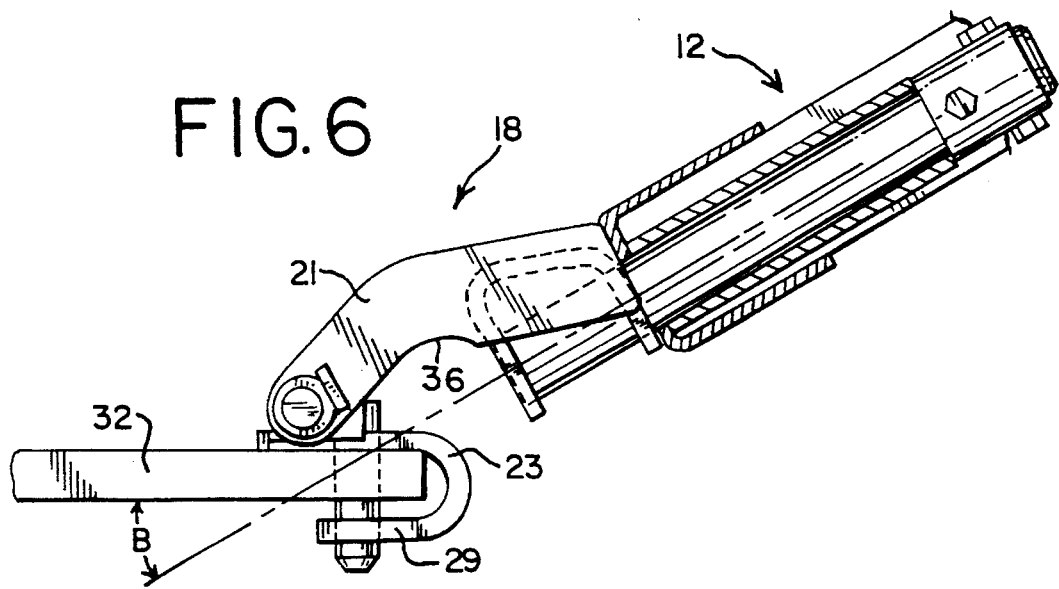

IMPLEMENT AND HITCH

BACKGROUND AND DESCRIPTION OF THE INVENTION

The present invention generally relates to an implement having an improved hitch and to an improved hitch for an implement. More particularly, the invention relates to a hitch apparatus for connecting an agricultural or industrial implement or the like to a tractor or other pulling vehicle, as well as to such implements having the hitch apparatus. The hitch apparatus includes a hitch component pivotally secured to a clevis component along a generally horizontal axis. The hitch component is secured, preferably in a rotatable manner, to the tongue portion of the implement. The clevis component is arranged to receive the drawbar of the pulling vehicle and is secured thereto by a hitch pin or similar connecting member. The hitch bears down on the clevis at a location which is forward of the connecting member. With this arrangement, the front portion of the hitch bears the weight of the implement. In addition, the implement is free to move upwardly and downwardly in view of the rotational mounting between the hitch and clevis. Although the invention is not so limited, the hitch apparatus is particularly useful as a component of a rotary cutter type of implement.

In a typical implement hitch arrangement, a clevis is provided which generally brackets the drawbar of a tractor or other pulling vehicle, and a hitch pin passes through one lip or wing of the clevis, then through the tractor drawbar, and finally through the other lip or wing of the clevis. In such a standard hitch arrangement, the implement has a limited range of vertical movement vis-a-vis the pulling vehicle which will allow the implement to traverse certain terrain variations by virtue of lever-type movement that is allowed by the vertical spacing between the lips of the clevis and the drawbar. The latter movement with a standard hitch arrangement allows some limited vertical motion when the vehicle pulls the implement over the crest of a knoll or a hill or through a gully or ravine. At these times, the contact surface area, and thus the load-transmitting area, is substantially reduced when compared to the load transfer area that is present when the clevis lip is generally parallel to the tractor drawbar, which is rarely the case when the tractor and implement move over normal terrain being traversed by the tractor and implement.

With a standard hitch as discussed hereinabove, the contact area between the hitch clevis and the tractor drawbar is relatively small. In addition, this small contact area is subjected to relatively high stresses when the clevis constantly engages, disengages and engages again a portion of either the top or bottom surface of the tractor drawbar as the implement is pulled through a field or the like. In this standard hitch arrangement, the clevis does not remain parallel to the drawbar, but moves through various acute angles with respect to the drawbar, depending upon the particular attitude of the implement. This decreases contact surface area as generally discussed above, which increases wear and also increases the likelihood of damage to the drawbar and/or the clevis or other hitch components.

Also, with a standard hitch, the range of movement in the up and down directions is limited by the "play" or spacing between the clevis lips and the drawbar. A tight fit in this regard substantially narrows the range of vertical movement. While increased spacing between the lips of the clevis could provide additional vertical movement, this is often at the expense of hitch control and long life of the components at the hitching location.

With standard hitch arrangements, the weight of the implement is typically transmitted to the drawbar in the vicinity of the hitch pin. The hitch pin hole is typically near the free end of the drawbar and thus is relatively far from the location at which the drawbar is secured to the pulling vehicle. Consequently, the transfer weight of the implement is imparted to the drawbar at a location spaced relatively far away from the drawbar support location, and relatively large stresses can thus be placed on the drawbar, as a result of which the load carrying capacity of the drawbar is less than could be possible if the weight of the implement were to be positioned at a location closer to the drawbar support location.

Previous approaches have attempted to improve upon typical standard hitching arrangements. For example, U.S. Pat. No. 2,867,452 shows a clevis which pivots on a cross-pin inserted through arms of a weldment. This weldment is journalled into a block of a trailer unit. This permits rotation about the entirety of the hitch assembly. A bolt retains the hitch assembly to the drawbar of a tractor. This type of a hitch assembly allows for a "universal" type of movement.

U.S. Pat. No. 4,200,306 describes a tractor drawbar inserted into a clevis provided with a tube arranged for receiving a pivot bolt. This pivot bolt passes through trunnions which are welded to a plate. This plate has a collar welded to it, which collar is journalled on a tube shaft extending through a hole to provide it in a base. Such base is mountable onto an agricultural implement so as to permit rotation of the weldment. This patent requires a specific bearing assembly for achieving its objectives. The structure of either of these patents does not remove various deficiencies found in typical standard hitch arrangements as generally discussed above.

Also, approaches such as those shown in U.S. Pat. No. 4,711,461 are intended to provide trailer hitches to achieve coupling about three independent axes. In the particular arrangement of this patent, two separate U-shaped yoke members are required. Also required are structures such as a bolt extending between opposite ends of two cylindrical members and through the center of a hollow, cylindrical sleeve to retain cylindrical member surfaces in abutment with each other. While the yoke member is shown for mounting on a trailer by means of a rotatable joint, it has a coupling web member which does not swing vertically, although the hinge pin does permit such movement. Also, this arrangement is not one wherein the hitch assembly readily connects to a standard horizontally oriented drawbar of a tractor or the like.

The present invention avoids the various disadvantages of standard hitch arrangements as generally discussed herein while also improving upon various other approaches such as those of the patents discussed herein. This is achieved while providing a hitch arrangement wherein the clevis remains parallel to the drawbar regardless of the attitude of the implement as it is being pulled through the field or other ground area being worked by the implement.

In summary, the implement hitch in accordance with the present invention attaches a tow-behind implement to a pulling vehicle such as a tractor. The invention also encompasses an implement having such a hitch. The hitch assembly is secured to the tongue or the like of the tow-behind implement. The implement hitch further includes an offset hitch component that extends generally forwardly to provide operative connection to the clevis assembly for operatively securing the hitching apparatus to the drawbar or the like of the pulling vehicle. Holes are provided for passing a hitch pin through the clevis and drawbar in order to thereby provide the attachment between the implement hitch and the towing vehicle. The weight of the implement is transmitted to the drawbar at a location forward of the hitch pin securement location. The offset hitch member is pivotally secured to the clevis assembly at this forward location. This pivotal securement includes a pivot mount location which is generally horizontal and which encompasses a forwardly extending clevis surface which is in front of the pivot pin location.

It is a general object of the present invention to provide an improved implement hitch as well as implements which are improved by incorporating same.

Another object of the present invention is to provide an improved implement hitch and implement by which farm or industrial implements are attached to tractor drawbars by a positive but flexible connection between the implement and the tractor.

Another object of the present invention is to provide an improved implement hitch and implement wherein the clevis is substantially parallel to the drawbar during operation, regardless of the attitude of the implement.

Another object of the present invention is to provide an improved implement hitch and implement having an increased contact surface area between the drawbar and the clevis while the implement is being pulled and used, thereby reducing wear and the possibility of drawbar damage.

Another object of the present invention is to provide an improved implement and implement hitch structured such that the weight of the implement is transferred to the drawbar at a location ahead of the hitch pin, thereby reducing stress on the drawbar and increasing the load carrying capacity of the drawbar.

Another object of the present invention is to provide an implement and implement hitch exhibiting rotational attributes that are improved over standard hitch arrangements, including increased angular movement of the hitch to facilitate crossing of rougher terrain without damage to the drawbar or hitch components.

Another object of the present invention is to provide an improved implement and implement hitch having a clevis with a relatively short lower lip which hangs at a favorable angle from the hitch prior to connection to the tractor in order to allow the tractor operator to back the tractor drawbar into the hitch in a relatively easy manner despite the fact that the clevis is pivotable on, rather than rigidly mounted to the implement hitch.

These and other objects, features and advantages of the present invention will be clearly understood through a consideration of the following detailed description.

BRIEF DESCRIPTION OF THE DRAWINGS

The invention will be further elucidated in the following description with reference to the drawings in which:

FIG. 4 is an elevational view, partially in cross-section, of the implement hitch and implement tongue shown secured to the drawbar of a pulling vehicle when the pulling vehicle and implement are substantially horizontally in line with one another, such as when the vehicle is pulling the implement over level ground;

FIG. 5 is a view similar to FIG. 4 but in which the implement is at an attitude that is lower than that of the pulling vehicle; and FIG. 6 is a view similar to FIG. 4 but in which the implement is at an attitude that is higher than that of the pulling vehicle.

DESCRIPTION OF THE PARTICULAR EMBODIMENTS

Figure 1:
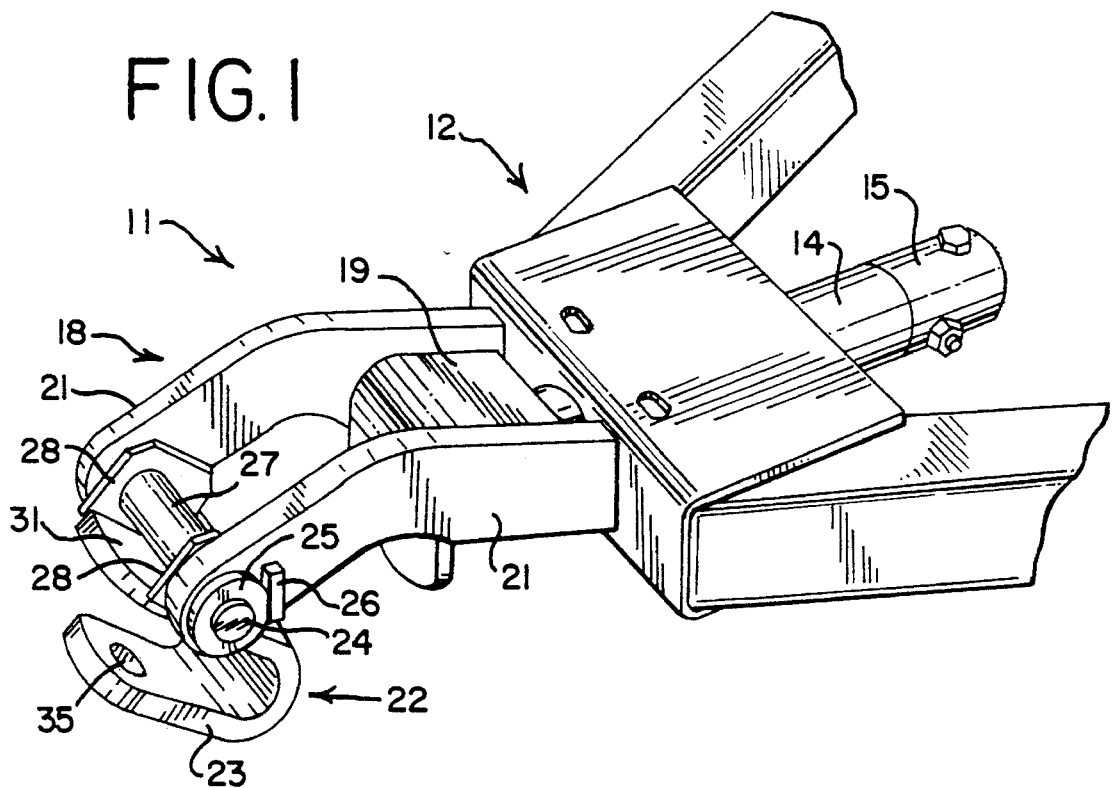
FIG. 1 is a perspective view of a preferred embodiment of the implement hitch in accordance with the present invention, shown secured to a typical tongue of a farm or industrial implement, which is partially shown.
Figure 2:
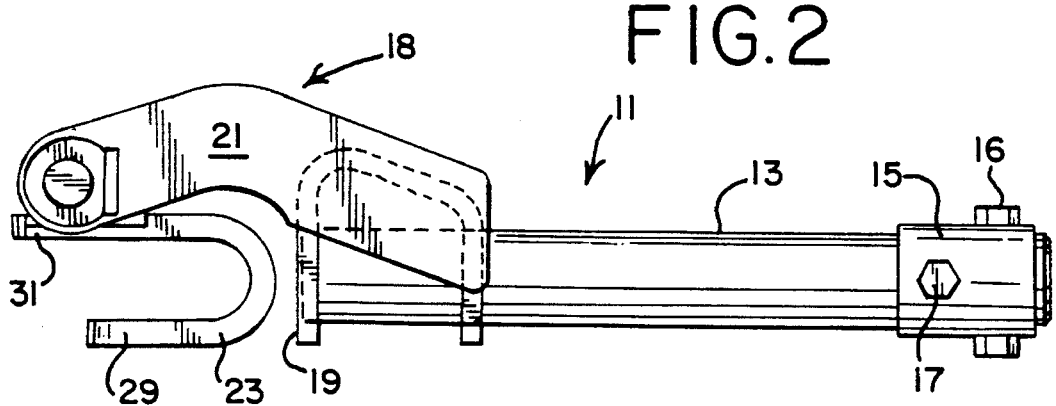
FIG. 2 is an elevational view of the implement hitch illustrated in FIG. 1.
Figure 3:
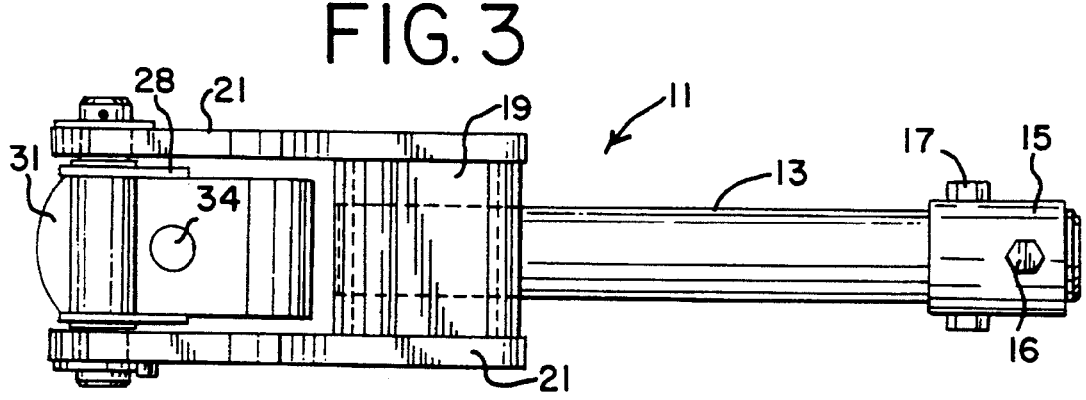
FIG. 3 is a top plan view of the implement hitch illustrated in FIG. 1.

A preferred embodiment of the implement hitch in accordance with the present invention is generally illustrated at 11 in FIGS. 1, 2 and 3. Also illustrated in FIG. 1 is a forward portion of a farm or industrial implement including its tongue assembly, generally designated at 12. It will be noted that the implement hitch assembly 11 and the tongue assembly 12 of the implement are attached together by means described in greater detail herein, the attachment being such that they will remain secured together during towing.

With more particular reference to the attachment arrangement that is illustrated, a shaft 13 of the implement hitch projects rearwardly into the tongue assembly. The illustrated tongue assembly 12 includes a securement tube 14 (FIG. 1 and FIG. 4) through which the shaft 13 is mounted. A collar 15 is secured to the shaft 13 at or near its rearwardly directed end, such as through the use of one or more bolts 16, 17. As is perhaps best seen in FIGS. 4, 5 and 6, when thus assembled, the securement tube 14 (and thus the tongue assembly 12 and its implement) has the freedom to rotate generally along the longitudinal axis of the shaft 13. It will be noted that this rotation is possible through a full 360°. Likewise, the hitch assembly can rotate 360° inside of the implement tongue.

A hitch component, generally designated at 18, is secured to the attachment assembly. In the illustrated embodiment, the hitch component 18 is attached in a secure manner to the shaft 13, more specifically at a forwardly directed or front portion of the shaft 13. This is accomplished by a strap mount 19 in the illustrated arrangement. Strap mount 19 is welded or otherwise secured to the shaft 13 as well as to a pair of hitch side straps 21 which extend generally forwardly.

Pivotally mounted to the front portion of the hitch component is a clevis component, generally designated at 22. The illustrated clevis component includes a clevis member 23 which is suspended from and pivotally mounted to the front end of the hitch component. In the illustrated embodiment, this rotational connection or suspension is at a pivot mount location which includes a pivot pin 24 that passes through holes at a forward end location of the hitch side straps 21. Pivot pin 24 has a pivot pin cap or head 25. In the preferred embodiment, in order to minimize wear of the components at the pivot mount location, a stop 26 is positioned to prevent rotation of the pivot pin 24. The illustrated pivot mount location further includes a pivot tube 27 which is mounted over the pivot pin 24 and rotates thereon. Tube supports or ears 28 secure the pivot tube 27 to the clevis member 23, such as by welding. It will be appreciated that the clevis member 23 thus is swingingly mounted from the hitch component in a generally cantilevered fashion.

It will be also be noted that the lower lip 29 of the clevis member 23 is shorter in length than the upper lip 31 of the clevis member. This shorter lower lip of the clevis and the angle at which the clevis hangs when free allows the tractor operator to back up the tractor so that its drawbar 32 (FIG. 4) readily engages, swings and enters into the clevis member 23. Thereafter, a hitch pin 33 is passed into and through holes 34, 35 of the clevis member 23. Hitch pin 23 can be of a standard type that is typically used to connect implement hitch mechanisms to tractor drawbars and the like.

It will be further noted that the pivot mount location and specifically the pivot axis of the clevis with respect to the hitch is at a location in front of the hitch pin location. In addition, the bulk of the transfer weight of the implement is ahead of the hitch pin and is thus farther forward on the drawbar 32 than is the hitch pin. Because the implement weight is transmitted to a location closer to the position at which the drawbar is connected to or supported by the tractor (not shown), stress on the drawbar is reduced when compared with hitches that present the load of the implement at a more rearward location which is spaced farther away from the tractor's drawbar support. As a result of this location of the pivot mount and of the area onto which the load of the vehicle is transferred, the load carrying capacity of the tractor drawbar is thereby increased.

This pivot mount location also facilitates maintenance of the clevis at an orientation which is parallel to the drawbar regardless of the attitude of the implement. This increases the contact surface area, which reduces both wear and the possibility of drawbar damage. More particularly, due in large measure to the rotational relationship between the clevis 23 and the hitch component 18, vertical movement of the implement with respect to the pulling vehicle moves only the hitch component 18, while the clevis member 23 remains in full engagement with the drawbar. This is illustrated generally in FIGS. 4, 5 and 6. It will be noted the clevis member 23 remains in full contact with the top surface of the drawbar 32. This level or parallel relationship remains whether the pulling vehicle and implement are at the same height, as generally shown in FIG. 4, whether the implement is at a location lower than that of the pulling vehicle as shown in FIG. 5, or whether the implement is at a location above the pulling vehicle as shown in FIG. 6. Also contributing to this consistently level or parallel relationship is the forward position of the pivot mount location which enhances the stability of the relationship between these components.

In the illustrated embodiment, the downward swing illustrated in FIG. 5 is represented by an angle "A", which is on the order of about 20°. In this illustrated embodiment, this angle "A" is limited by the clearance between the bottom of the hitch side straps 21 and the drawbar 32. Angle "A" could be extended by increasing this spacing, such as by modifying the shape and/or the vertical thickness of the hitch side straps 21. FIG. 6 illustrates movement of the hitch component in an upward direction through an angle "B". This angular movement can in theory proceed through 90°, although in practice this upward rotation typically is limited by other physical constraints, such as engagement with a telescoping drive shaft (not shown) that would drivingly connect the implement with a drive component of the pulling vehicle. In any event, it will be appreciated that this arrangement provides for an increased degree of vertical movement when compared with standard hitch arrangements while simultaneously maintaining substantially the same relative position between the force transmitting or weight bearing components.

With more particular reference to the hitch component 18, the vertical profile thereof is offset when compared with a direct horizontal hitch connection of a more standard hitch arrangement. The illustrated offset hitch component, particularly the illustrated hitch side straps 21 have a generally arched configuration. The illustrated hitch side straps 21 include an indent 36 along its bottom surface so as to provide the clearance needed to accommodate the drawbar when the offset hitch assembly rotates downwardly as generally shown in FIG. 5. With the offset structure which is illustrated, a first or rearward component 37 of each hitch side strap is offset from a second more forward component 38 of each hitch side strap, the offset being at an obtuse angle, with the pivot mount location being at the forward end portion of the second or forward component 38.

It will be understood that the embodiments of the present invention which have been described are illustrative of some of the applications of the principles of the present invention. Various modifications may be made by those skilled in the art without departing from the true spirit and scope of the invention.

What is claimed is:

1. A hitch apparatus for attaching a tow-behind implement to a pulling vehicle, the hitch apparatus comprising:

an attachment assembly for operatively securing a hitch component of the hitch apparatus to a tongue or the like of a tow-behind implement;

said hitch component is secured to said attachment assembly and includes an offset hitch member that extends generally forward with respect to the tow-behind implement, said offset hitch member having a pivot mount location at a front end portion thereof, said offset hitch member having a rearward component which is offset from said front end portion by an obtuse angle;

a clevis component for operatively securing the hitch apparatus to a drawbar or the like of a pulling vehicle, said clevis component having an opening for receiving a hitch pin to releasably attach the hitch apparatus to the drawbar, said clevis component having a front portion support area located forwardly of said opening for receiving the hitch pin; and said front portion support area of the clevis component generally coincides with said pivot mount location of the front end portion of the hitch component such that said hitch component pivots on, and the transfer weight of the tow-behind implement is borne primarily by, said clevis component at said pivot mount location which is forward of said opening for receiving the hitch pin.

2. The hitch apparatus in accordance with claim 1, wherein said offset hitch member has a generally arched configuration.

3. The hitch apparatus in accordance with claim 1, wherein said offset hitch member has an indent at its bottom surface, and said indent accommodates the drawbar when said offset hitch member rotates downwardly at said pivot mount location forward of said opening for receiving the hitch pin.

4. The hitch apparatus in accordance with claim 2, wherein said offset hitch member has an indent at its bottom surface, and said indent accommodates the drawbar when offset hitch member rotates downwardly at said pivot mount location forward of the opening for receiving the hitch pin.

5. The hitch apparatus in accordance with claim 1, wherein said front end portion of said offset hitch member is on a hitch member forward component which is forward of and offset from said rearward component.

6. The hitch apparatus in accordance with claim 5, wherein said rearward component and said forward component define a generally arched configuration.

7. The hitch apparatus in accordance with claim 1, wherein said offset hitch member includes a pair of generally arched straps spaced from and attached to each other by a strap mount at a generally rearward portion of said offset hitch member, and said pivot mount location extends generally between said pair of straps.

8. The hitch apparatus in accordance with claim 1, wherein said clevis component is pivotally mounted to said front end portion of the hitch component at said pivot mount location along a generally horizontal axis which is generally transverse to the direction of travel of the implement.

9. The hitch apparatus in accordance with claim 1, wherein said clevis component has a lower lip and an upper lip, and said lower lip has a forward edge which is rearward of said pivot mount location.

10. A tow-behind implement having a hitch apparatus for attaching same to a pulling vehicle, the hitch apparatus comprising:

an attachment assembly for operatively securing a hitch component of the hitch apparatus to a tongue or the like of the tow-behind implement;

said hitch component is secured to said attachment assembly and includes an offset hitch member that extends generally forward with respect to the tow-behind implement, said offset hitch member having a pivot mount location at a front end portion thereof, said offset hitch member having a rearward component which is offset from said front end portion by an obtuse angle;

a clevis component for operatively securing the hitch apparatus to a drawbar or the like of a pulling vehicle, said clevis component having an opening for receiving a hitch pin to releasably attach the hitch apparatus to the drawbar, said clevis component having a front portion support area located forwardly of said opening for receiving the hitch pin; and said front portion support area of the clevis component generally coincides with said pivot mount location of the front end portion of the hitch component such that said hitch component pivots on, and the transfer weight of the tow-behind implement is borne primarily by, said clevis component at said pivot mount location forward of said opening for receiving the hitch pin.

11. The implement in accordance with claim 10, wherein said offset hitch member has a generally arched configuration.

12. The implement in accordance with claim 10, wherein said offset hitch member has an indent at its bottom surface, and said indent accommodates the drawbar when said offset hitch member rotates downwardly at said pivot mount location forward of said opening for receiving the hitch pin.

13. The implement in accordance with claim 10, wherein said offset hitch member includes a pair of generally arched straps spaced from and attached to each other by a strap mount at a generally rearward portion of said offset hitch member, and said pivot mount location extends generally between said pair of straps.

14. The implement in accordance with claim 10, wherein said attachment assembly includes a shaft which is mounted for rotation within a securement tube of the implement tongue.

15. The implement in accordance with claim 10, wherein said clevis component is pivotally mounted to said front end portion of the hitch component at said pivot mount location along a generally horizontal axis which is generally transverse to the direction of travel of the implement.

16. The implement in accordance with claim 10, wherein said clevis component has a lower lip and an upper lip, and said lower lip has a forward edge which is rearward of said pivot mount location.

17. The implement in accordance with claim 16, wherein said upper lip of the clevis component is in generally parallel engagement with the drawbar while the height relationship between the tow-behind implement and the pivot mount location changes.

18. A hitch apparatus for attaching a tow-behind implement to a pulling vehicle, the hitch apparatus comprising:

an attachment assembly for operatively securing a hitch component of the hitch apparatus to a tongue or the like of a tow-behind implement;

said hitch component is secured to said attachment assembly and includes an offset hitch member that extends generally forward with respect to the tow-behind implement, said offset hitch member has a pivot mount location at a front end portion thereof and has a generally arched configuration;

a clevis component for operatively securing the hitch apparatus to a drawbar or the like of a pulling vehicle, said clevis component having an opening for receiving a hitch pin to releasably attach the hitch apparatus to the drawbar, said clevis component having a front portion support area located forwardly of said opening for receiving the hitch pin; and said front portion support area of the clevis component generally coincides with said pivot mount location of the front end portion of the hitch component such that said hitch component pivots on, and the transfer weight of the tow-behind implement is borne primarily by, said clevis component at said pivot mount location which is forward of said opening for receiving the hitch pin.

19. The hitch apparatus in accordance with claim 18, wherein said offset hitch member has an indent at its bottom surface, and said indent accommodates the drawbar when said offset hitch member rotates downwardly at said pivot mount location forward of the hitch pin.

20. The hitch apparatus in accordance with claim 18, wherein said clevis component is pivotally mounted to said front end portion of the hitch component at said pivot mount location along a generally horizontal axis which is generally transverse to the direction of travel of the implement.

21. The hitch apparatus in accordance with claim 18, wherein said clevis component has a lower lip and an upper lip, and said lower lip has a forward edge which is rearward of said pivot mount location.

22. A hitch apparatus for attaching a tow-behind implement to a pulling vehicle, the hitch apparatus comprising:

an attachment assembly for operatively securing a hitch component of the hitch apparatus to a tongue or the like of a tow-behind implement;

said hitch component is secured to said attachment assembly and includes an offset hitch member that extends generally forward with respect to the tow-behind implement, said offset hitch member having a pivot mount location at a front end portion thereof;

a clevis component for operatively securing the hitch apparatus to a drawbar or the like of a pulling vehicle, said clevis component having an opening for receiving a hitch pin to releasably attach the hitch apparatus to the drawbar, said clevis component having a front portion support area located forwardly of said opening for receiving the hitch pin;

said front portion support area of the clevis component generally coincides with said pivot mount location of the front end portion of the hitch component such that said hitch component pivots on, and the transfer weight of the tow-behind implement is borne primarily by, said clevis component at said pivot mount location which is forward of said opening for receiving the hitch pin; and said offset hitch member has an indent at its bottom surface, and said indent accommodates the drawbar when said offset hitch member rotates downwardly at said pivot mount location forward of the hitch pin.

23. A hitch apparatus for attaching a tow-behind implement to a pulling vehicle, the hitch apparatus comprising:

an attachment assembly for operatively securing a hitch component of the hitch apparatus to a tongue or the like of a tow-behind implement;

said hitch component is secured to said attachment assembly and includes an offset hitch member that extends generally forward with respect to the tow-behind implement, said offset hitch member having a pivot mount location at a front end portion thereof;

said offset hitch member includes a first component secured to said attachment assembly and a second component offset from said first component by an obtuse angle, and said pivot mount location is at said second component;

a clevis component for operatively securing the hitch apparatus to a drawbar or the like of a pulling vehicle, said clevis component having an opening for receiving a hitch pin to releasably attach the hitch apparatus to the drawbar, said clevis component having a front portion support area located forwardly of said opening for receiving the hitch pin; and said front portion support area of the clevis component generally coincides with said pivot mount location of the front end portion of the hitch component such that said hitch component pivots on, and the transfer weight of the tow-behind implement is borne primarily by, said clevis component at said pivot mount location which is forward of said opening for receiving the hitch pin.

24. The hitch apparatus in accordance with claim 23, wherein said first component and said second component define a generally arched configuration.

25. A hitch apparatus for attaching a tow-behind implement to a pulling vehicle, the hitch apparatus comprising:

an attachment assembly for operatively securing a hitch component of the hitch apparatus to a tongue or the like of a tow-behind implement;

said hitch component is secured to said attachment assembly and includes an offset hitch member that extends generally forward with respect to the tow-behind implement, said offset hitch member having a pivot mount location at a front end portion thereof;

said offset hitch member includes a pair of generally arched straps spaced from and attached to each other by a strap mount at a generally rearward portion of said offset hitch member, and said pivot mount location extends generally between said pair of straps;

a clevis component for operatively securing the hitch apparatus to a drawbar or the like of a pulling vehicle, said clevis component having an opening for receiving a hitch pin to releasably attach the hitch apparatus to the drawbar, said clevis component having a front portion support area located forwardly of said opening for receiving the hitch pin; and said front portion support area of the clevis component generally coincides with said pivot mount location of the front end portion of the hitch component such that said hitch component pivots on, and the transfer weight of the tow-behind implement is borne primarily by, said clevis component at said pivot mount location which is forward of said opening for receiving the hitch pin.

26. A tow-behind implement having a hitch apparatus for attaching same to a pulling vehicle, the hitch apparatus comprising:

an attachment assembly for operatively securing a hitch component of the hitch apparatus to a tongue or the like of the tow-behind implement;

said hitch component is secured to said attachment assembly and includes an offset hitch member that extends generally forward with respect to the tow-behind implement, said offset hitch member has a pivot mount location at a front end portion thereof and has a generally arched configuration;

a clevis component for operatively securing the hitch apparatus to a drawbar or the like of a pulling vehicle, said clevis component having an opening for receiving a hitch pin to releasably attach the hitch apparatus to the drawbar, said clevis component having a front portion support area located forwardly of said opening for receiving the hitch pin; and said front portion support area of the clevis component generally coincides with said pivot mount location of the front end portion of the hitch component such that said hitch component pivots on, and the transfer weight of the tow-behind implement is borne primarily by, said clevis component at said pivot mount location forward of said opening for receiving the hitch pin.

27. A tow-behind implement having a hitch apparatus for attaching same to a pulling vehicle, the hitch apparatus comprising:

an attachment assembly for operatively securing a hitch component of the hitch apparatus to a tongue or the like of the tow-behind implement;

said hitch component is secured to said attachment assembly and includes an offset hitch member that extends generally forward with respect to the tow-behind implement, said offset hitch member having a pivot mount location at a front end portion thereof;

a clevis component for operatively securing the hitch apparatus to a drawbar or the like of a pulling vehicle, said clevis component having an opening for receiving a hitch pin to releasably attach the hitch apparatus to the drawbar, said clevis component having a front portion support area located forwardly of said opening for receiving the hitch pin;

said front portion support area of the clevis component generally coincides with said pivot mount location of the front end portion of the hitch component such that said hitch component pivots on, and the transfer weight of the tow-behind implement is borne primarily by, said clevis component at said pivot mount location forward of said opening for receiving the hitch pin; and said offset hitch member has an indent at its bottom surface, and said indent accommodates the drawbar when said offset hitch member rotates downwardly at said pivot mount location forward of the hitch pin.

28. The implement in accordance with claim 27, wherein said attachment assembly includes a shaft which is mounted for rotation within a securement tube of the implement tongue.

29. The implement in accordance with claim 27, wherein said clevis component is pivotally mounted to said front end portion of the hitch component at said pivot mount location along a generally horizontal axis which is generally transverse to the direction of travel of the implement.

30. The implement in accordance with claim 27, wherein said clevis component has a lower lip and an upper lip, and said lower lip has a forward edge which is rearward of said pivot mount location.

31. The implement in accordance with claim 30, wherein said upper lip of the clevis component is in generally parallel engagement with the drawbar while the height relationship between the tow-behind implement and the pivot mount location changes.

* * * * *